June 11, 1940.  A. E. YOUNG  2,204,241
CLUTCH MECHANISM
Filed Aug. 29, 1938   2 Sheets-Sheet 1
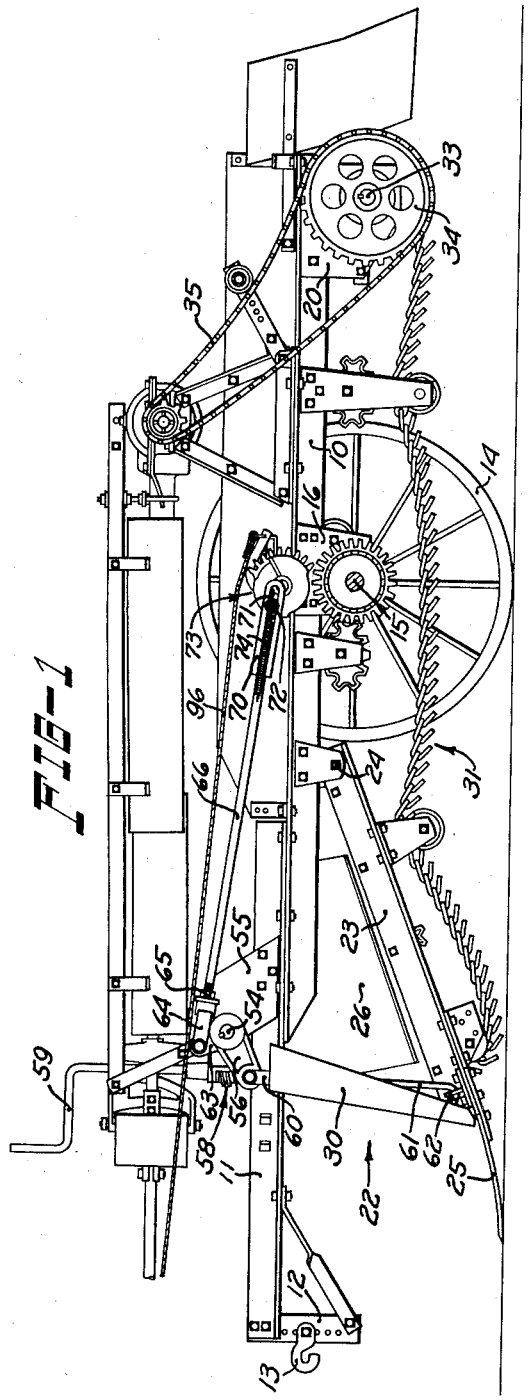
INVENTOR
AUSTIN E. YOUNG
BY
ATTORNEYS June 11, 1940.  A. E. YOUNG  2,204,241
CLUTCH MECHANISM
Filed Aug. 29, 1938  2 Sheets-Sheet 2
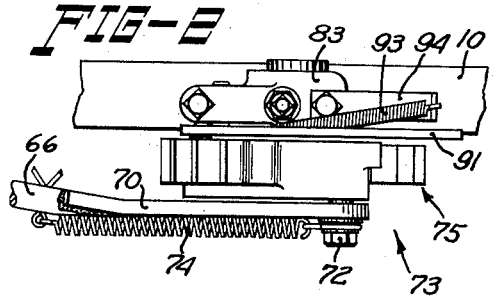
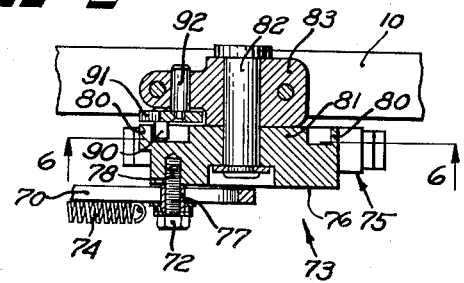
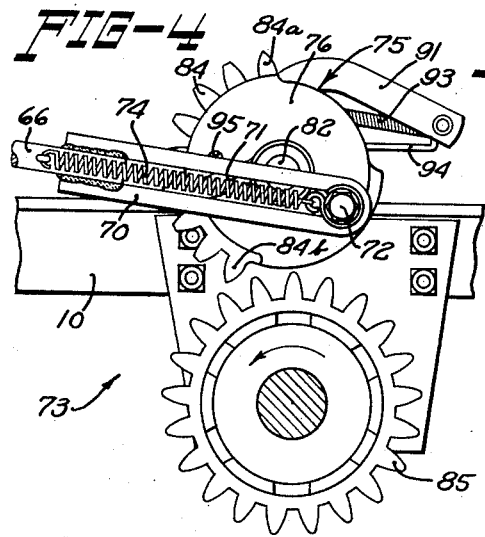
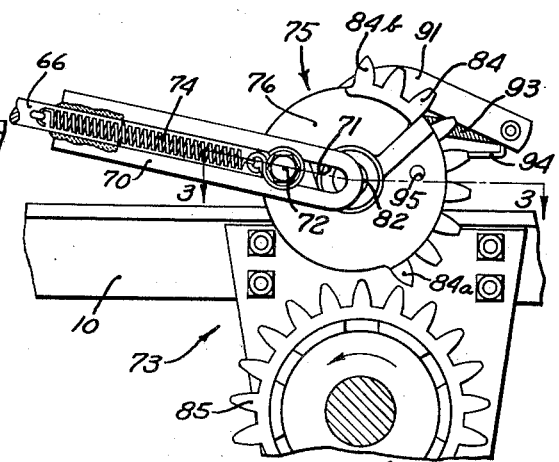
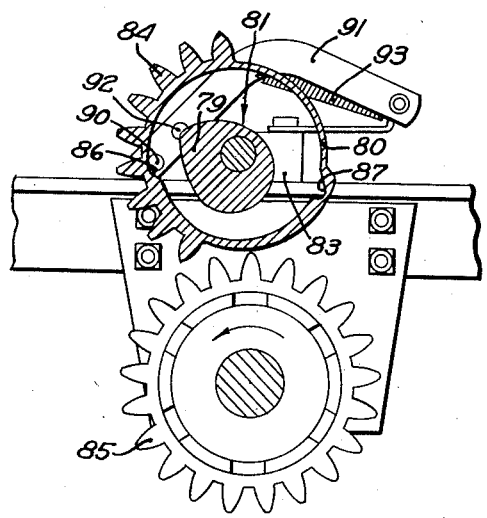
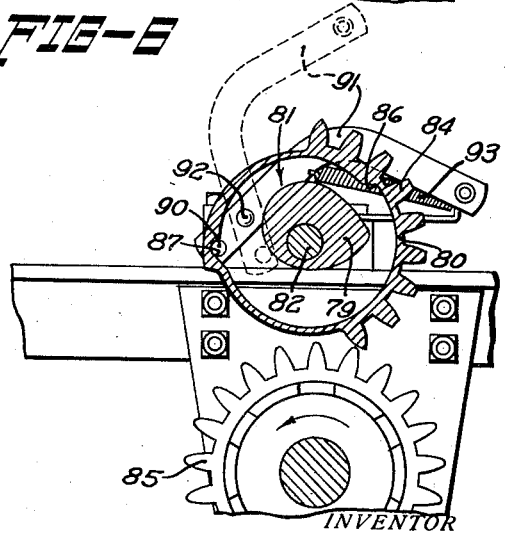
INVENTOR
AUSTIN E. YOUNG
BY
ATTORNEYS Patented June 11, 1940

2,204,241

UNITED STATES PATENT OFFICE 2,204,241

CLUTCH MECHANISM

Austin E. Young, Syracuse, N. Y., assignor to Syracuse Chilled Plow Co., Inc., Syracuse, N. Y., a corporation of New York Application August 29, 1938, Serial No. 227,241

9 Claims. (Cl. 97—72)

The present invention relates generally to agricultural implements such as potato diggers and the like, and is more particularly concerned with lifting clutch mechanism for raising and lowering the operating units between ground engaging and transport positions.

The principal object of the present invention is the provision of new and improved self-interrupting clutch means for raising and lowering implement units relative to the main supporting frame thereof.

Another object is to provide a lifting clutch that is simple, inexpensive, and easy to manufacture.

A further object is to provide lifting mechanism actuated by a supporting ground wheel and which is operable by backing the implement.

These and other objects and advantages of the present invention will become apparent after a consideration of the following detailed description of a preferred construction, reference being had to the accompanying drawings, in which:

Figure 1 is a side view of a potato digger embodying the principles of the present invention, with the near supporting wheel removed in order to better illustrate the parts of the machine;

Figure 2 is a top view, drawn to an enlarged scale, of the power lift unit;

Figure 3 is a section taken substantially along the line 3—3 of Figure 5;

Figure 4 is a side view of the power lift unit shown in Figure 2, with the parts arranged in the positions they occupy when the shovel unit is raised to transport position;

Figure 5 is a view similar to Figure 4, showing the positions assumed by the parts when the shovel unit is lowered to ground working position;

Figure 6 is a section taken substantially along the line 6—6 of Figure 3;

Figure 7 is a view similar to Figure 6 showing the arrangement of the internal parts when the power lift unit is in the position illustrated in Figure 4;

Figure 8 is a view showing the alternate connection of the lifting linkage to the power lift unit for raising the shovel unit when the implement is backed up, the parts being shown in the positions they assume when the shovel unit is in digging position;

Figure 9 is a view similar to Figure 8 but with the shovel unit raised to transport position; and Figure 10 is a partial section, showing the arrangement of the internal parts when the power lift is in the position shown in Figure 9.

Referring now to the drawings and more particularly to Figure 1, the potato digger illustrated herein is similar to that shown and described in Patent No. 2,172,435, granted September 12, 1939, to Curtiss L. Cook, and reference may be had to the said patent for details of construction and operation. Briefly, the potato digger comprises a horizontal, generally longitudinally extending frame 10 having a draft frame 11 fixed to the forward ends thereof, and a hitch plate 12 of any suitable construction bolted to the front ends of draft frame 11. The hitch plate 12 is adapted to be connected with or carry a part 13 by which the front end of the machine is arranged to be supported, either on the drawbar of a propelling tractor, or on a suitable foretruck, as desired.

Supporting wheels 14 are mounted on a transverse axle 15 and the latter is journaled in suitable bearing brackets 16 fixed to the horizontal frame 10.

The shovel unit of the machine is indicated in its entirety by the reference numeral 22 and comprises an inclined frame 23 which is pivotally connected at 24 to the horizontal frame 10 and is provided at its lower end with a shovel 25. Side walls 26 and curved guard members 30 define the throat of the shovel unit 22, the guard member 30 being disposed ahead of and embracing a portion of the raising and lowering means to shield the same.

The elevator of the potato digger is indicated in its entirety by the reference numeral 31 and preferably comprises a single endless chain or belt of transversely disposed interlocking rods of more or less conventional design trained over supporting rollers which are rotatably supported in any suitable manner on the frames 10, 23. The rear portion of the elevator passes over driving sprockets (not shown) fixed in any suitable manner to a drive shaft 33 which is mounted for rotation in the rear brackets 20. The drive shaft 33 is extended through the bracket 20 and a sprocket 34 is fixed to the end thereof with a driving chain 35 trained around the sprocket.

The shovel unit 22 is raised and lowered by means including a transverse rock shaft 54 journaled in brackets 55 that are fixed to the frame 10. Each end of the rock shaft 54 is provided with a lifting arm 56 which is rigidly secured to the shaft 54 in any suitable manner. The outer end of the arm 56 is pivotally connected to the upper end of a yoke 60 comprising part of a link 61 having a hook in its lower end that is engaged in an apertured bracket 62 which is fixed to the forward end of the shovel unit frame 22.

The operating depth of the shovel 25 is determined by adjustable control means, indicated generally by the reference numeral 58, which acts to limit the rocking movement of the shaft 54 in a counter-clockwise direction under the influence of the weight of the shovel unit 22 and is actuated by a hand crank 59. Details of the construction and operation of this depth adjusting mechanism is described in the above mentioned patent.

The rock shaft 54 is actuated by power derived from one of the supporting wheels 14, and to this end the lifting arm 56 is formed with a lug 63 serving as an actuating arm for the rock shaft 54, and a yoke 64 is pivoted to the arm 63 and is adjustably connected, as at 65, to the forward end of a longitudinally disposed link 66. The rear end of the link 66 is fixed, as by welding, to a bar 70 which is slotted, as at 71 and engages a crank pin 72 that is carried on and forms a part of the power lift unit, indicated in its entirety by the reference numeral 73. A spring 74 is connected at its forward end to the link 66 and at its rear end to the pin 72 so that the latter always tends to occupy a forward position in the slot 71. The purpose of the slot 71 is to provide a limited amount of lost motion in the lifting linkage so that the depth adjustment of the shovel unit 22 will not affect the operation of the power lift unit 73.

The power lift unit 73 includes a rotatable disc-like member 75 having a solid outer face 76 (Figures 4 and 5) and laterally inwardly directed flange and hub sections 80 and 81. The crank pin 72 is preferably in the form of a bolt threaded into a threaded aperture 78 formed in the outer face 76 of the rotatable member 75 and is provided with a sleeve bushing 77 (Figure 3) adapted to slide freely back and forth within the slot 71. The hub section 81 is provided with a cam portion 79 and is journaled for rotation on a stub shaft 82 carried in fixed relation on the frame 10 by any suitable means, such as a bracket 83. The flange section 80 is in the nature of a mutilated gear having a gear segment 84 extending around a portion of the outer periphery of the member 75 and adapted to mesh with a driving gear 85 fixed to rotate with the ground wheel 14 at all times. The end teeth 84a and 84b at each end of the gear segment are pointed to facilitate engagement with the driving gear 85. The inner periphery of the laterally inwardly directed flange 80 is provided with a pair of recesses 86 and 87 disposed substantially diametrically opposite one another and adapted to receive a pin 90 fixed on the end of a control lever 91 and extending laterally outwardly therefrom into the space between the hub 81 and flange 80. The control lever 91 is pivoted on a pin 92 suitably secured in the bracket 83 and is held with the pin 90 pressing outwardly against the inner periphery of the flange 80 by a spring 93, that is anchored at one end to the lever 91 and is connected at the other end to an arm 94 which is bolted to bracket 83. Normally, the pin 90 engages one of the recesses 86, 87 to hold the power lift gear in either the lowered position shown in Fig. 6 or the raised position shown in Fig. 7. A second threaded aperture 95 is provided in the outer face 76 of the rotatable member 75 substantially diametrically opposite aperture 78, and by removing the bolt 72 from aperture 78 and threading it into aperture 95, as shown in Figs. 8 and 9, the power lift 73 can be made to raise the shovel unit 22 upon backing the machine up. The apertures 78 (Figure 8) and 95 (Figure 5) preferably are formed in a counterweighted portion 76a (Figures 2 and 5) which extends arcuately from the edge 76b (Figure 5) to the edge 76c (Figure 8). A trip rope 96 (Fig. 1) is attached at its rear end to the control lever 91 to enable the operator to control the power lift from his station on the tractor.

The operation of the power lift described above is substantially as follows:

When the shovel unit is in its lowered or operating position the power lift parts are in the positions shown in Figures 5 and 6. If it is desired to raise the shovel unit into its inoperative or transport position, the operator pulls on the rope 96, which swings the control lever 91 forwardly into the dotted line position shown in Fig. 6. This disengages the pin 90 from the recess 87 and brings the pin 90 into engagement with the hub cam 79, which, assisted by the counterweighted portion 76a of the gear member 75, causes the power lift gear 75 to be rotated through a slight angle against the action of the spring 74 so as to bring the first tooth 84a into engagement with the teeth on the driving gear 85. The rotation of the wheel 14 drives the gear 85 in the direction of the arrow shown in Fig. 6 and this, in turn, rotates the gear member 75 in a clockwise direction as viewed in Figs. 4–6, inclusive. The first part of the rotation of the member 75 when the tooth 84a initially engages the gear 85 is not utilized to raise the shovel; instead, the first movement of the gear member 75 is opposed only by the spring 74, until the pin 72 is moved outwardly to the end of the slot 71. At this time the continued rotation of the gear member 75 then exerts a pull on the link 66 and rocks the shaft 54 in a clockwise direction, thereby lifting the shovel unit 22 into its raised position. It will thus be seen that no lifting action takes place until the teeth on the gear members 75 and 85 are fully in mesh. As the gear member 75 rotates, the hub cam 79 deflects the pin 90 outwardly, rocking the control lever back in a clockwise direction and exerting a warning pull on the trip rope 96 in the event that the operator has not yet released his pull on the rope. When the gear 85 has driven the power lift gear 75 through substantially 180° the recess 86 is in a position to engage the pin 90 after the last tooth 84b has cleared the teeth of gear 85 and the gear member 75 has rotated a slight amount further in the same direction under the influence of the spring 74 and the weight of the shovel unit 22. As will be noted in Fig. 4, the crank pin 72 is thus brought to over center position with relation to the shaft 82, and the weight of the raised shovel unit 22 exerts a clockwise turning force on the gear member 75, said turning force being resisted by the engagement of the pin 90 in the recess 86. When the trip rope 96 is again pulled, the pin 90 is released from the recess 86, and the shovel unit 22 lowers by virtue of its own weight, pulling the power lift gear 75 around again in a clockwise direction to the position shown in Figs. 5 and 6, this position being determined by the engagement of the pin 90 in the recess 87 and by the tension of the spring 74 against the crank 72.

When it is desired to effect the raising of the shovel unit 22 while backing the machine up, the crank pin 72 is removed from the aperture 78 and threaded into the aperture 95, as shown in Figs. 8, 9 and 10. With the shovel unit 22 lowered into the ground, the power lift parts now assume the positions shown in Fig. 8, the combined weight of the parts attached to the crank pin 72 and the weight of the counterweighted portion 76a on the gear member 75 serving to hold the end tooth 84b of the gear member 75 in light contact with the teeth of driving gear 85. As long as the machine moves forwardly, the driving gear 85 rotates in a counterclockwise direction and the end tooth 84b slips over the teeth of the driving gear 85 with a ratchet effect. When the machine is backed up, however, and the gear 85 is rotated in the direction of the arrow shown in Fig. 8, the contacting tooth 84b meshes with the gear 85 and the power lift member 75 is rotated counterclockwise until the last tooth 84a has passed out of mesh with driving gear 85, at which time the motion of gear member 75, having carried the crank pin 72 beyond dead center, is stopped by the engagement of pin 90 in recess 87, as best shown in Fig. 10. In this instance the engagement of the power lift gear 75 with the driving gear 85 is automatic and occurs the moment the machine begins to move in reverse, the control lever 91 being used only when the shovel is in raised position to disengage the pin 90 from the recess 87 to allow the shovel unit to drop by gravity to its lowered digging position.

What I claim as new is:

1. A self interrupting clutch comprising, in combination, a driving gear, a driven mutilated gear member having teeth adapted to mesh with the teeth of said driving gear and rotate therewith through a portion of a revolution, control means engageable with said driven member for holding the latter out of engagement with said driving gear in either of two positions, means engaged by said control means and coacting therewith for engaging said driven member with said driving gear, and link means connected with said driven member.

2. A clutch as set forth in claim 1, further characterized by said link means being connected with said driven member by lost motion means which includes a biasing spring tending to take up said lost motion, rotation of said driving gear serving to bias said spring when the teeth of the driven gear are initially meshed with the teeth of said driving gear.

3. A self interrupting clutch comprising, in combination, a driving gear, a driven mutilated gear member having teeth adapted to mesh with the teeth of said driving gear and rotate therewith through a portion of a revolution, said driven member having a cam portion provided thereon, and releasable means for holding said driven member out of engagement with said driving gear, said holding means co-operating with said cam portion, when released, to engage said driven member with said driving gear.

4. A lifting clutch comprising a normally rotating driving member, a normally stationary driven member adapted to contact said driving member and rotate therewith through a partial revolution, releasable control means for holding said driven member out of contact with said driving member, means responsive to movement of said control means for urging said driven member into contact with said driving member, and link means connected with said driven member.

5. A lifting clutch comprising a driving gear normally rotating in one direction, a driven mutilated gear member disposed in sliding contact with said driving gear when the latter is rotating in one direction, said driven gear being engaged by said driving gear and rotated into mesh therewith when the driving gear rotates in the opposite direction, said driven gear member rotating with the driving gear through a partial revolution, means for holding said driven member out of engagement with said driving gear at the completion of said partial revolution, and means for returning said driven member to its initial position.

6. The combination, with an implement having a frame, a supporting wheel journaled thereon, a ground engaging tool mounted on said frame for vertical movement relative thereto, and lifting mechanism for raising and lowering said tool between operative and inoperative positions, of a lifting clutch comprising a driving gear actuated by said wheel, a driven member journaled on said frame and having a plurality of gear teeth formed along a portion of the outer periphery thereof adapted to mesh with the teeth of said driving gear and rotate therewith through substantially a half revolution, a control lever pivoted on said frame and engaging said driven member at either of two points to hold said driven member out of engagement with said driving gear, a crank pin fixed on said driven member in one position, means for mounting said crank pin on said driven member in a second position substantially diametrically opposite said first position whereby said lifting clutch is operable when said implement is backed up, and link means operatively connecting said crank pin with said lifting mechanism.

7. The combination, with an implement having a frame, a supporting wheel journaled thereon, a ground engaging tool mounted on said frame for vertical movement relative thereto, and lifting mechanism for raising and lowering said tool between operative and inoperative positions, of a lifting clutch comprising a driving gear actuated by said wheel, a driven member journaled on said frame and consisting of a hub cam portion and an outer flange portion, said flange having a plurality of gear teeth formed along a portion of the outer periphery thereof adapted to mesh with the teeth of said driving gear and rotate therewith through substantially a half revolution, a control lever pivoted on said frame and having a pin at the end thereof extending laterally into the space between said hub cam portion and said flange portion, said flange having pair of recesses formed in the inner periphery thereof substantially diametrically opposite one another and adapted to receive said control lever pin, whereby said driven member is held against rotation and out of contact with said driving gear in either of two positions, said pin acting against said cam when said control lever is tripped to engage said driven member with said driving gear, a crank pin fixed to said driven member, and link means operatively connecting said crank pin with said lifting mechanism.

8. For use with an implement having a wheel supported frame and an operating tool connected therewith for vertical movement between working and transport positions, a lifting clutch comprising a driving gear operatively connected with one of the supporting wheels, a driven gear member journaled on said frame and operatively connected with said driving gear so as to be rotated thereby through substantially a half revolution, control means on said frame engageable with said driven gear member for holding the latter in either of two diametrically opposite positions of disengagement from said driving gear, lifting linkage connecting said driven gear member with said tool whereby the latter is raised and lowered by successive half revolutions of the driven gear, and means for connecting said lifting linkage to said driven gear member at either of two points spaced substantially 180 degrees apart whereby said lifting clutch can be made to operate during either forward or rearward travel of the implement.

9. In combination, an implement frame, a tool connected therewith for vertical movement between a lowered working position and a raised transport position, a normally rotating driving gear journaled on the frame, a mutilated gear having teeth provided on less than half of its periphery, said mutilated gear being adapted to mesh with said driving gear and rotate therewith through a half revolution, link means connecting said mutilated gear with said tool whereby the latter is raised and lowered by rotation of the mutilated gear, control means operable to hold said mutilated gear in either of two diametrically opposite positions disengaged from said driving gear, said tool being raised when the mutilated gear is in one position and lowered when in the other position, said tool dropping by gravity from said raised transport position when said control means is actuated one time, causing said mutilated gear to rotate from said one position to said other position, and said mutilated gear being urged into engagement with said driving gear when said control means is actuated the succeeding time.

AUSTIN E. YOUNG.